United States Patent [19]

Mosby et al.

[11] 4,192,796

[45] Mar. 11, 1980

[54] POLYMERS STABILIZED WITH ORGANO-PHOSPHORUS COMPOUNDS

[75] Inventors: William L. Mosby, North Plainfield; William B. Hardy, Bound Brook, both of N.J.

[73] Assignee: American Cyanamid Company, Stamford, Conn.

[21] Appl. No.: 23,874

[22] Filed: Mar. 26, 1979

[51] Int. Cl.$^2$ ............................ C08K 5/53; C08K 5/50; C07C 121/75; C07C 103/26; C07C 69/76
[52] U.S. Cl. .................... 260/45.85 S; 260/45.85 P; 260/45.85 B; 260/45.9 KA; 260/45.9 NC; 260/559 R; 260/559 A; 260/940; 260/941; 260/942; 260/943; 560/75
[58] Field of Search ............... 260/940, 941, 942, 943, 260/465 F, 559 R, 559 A, 45.9 KA, 45.9 NC, 45.85 P, 45.85 B, 45.85 S; 560/75

[56] References Cited

U.S. PATENT DOCUMENTS

| 2,574,320 | 7/1956 | Johnston | 260/940 |
| 2,874,232 | 2/1959 | McConnell et al. | 260/943 |
| 3,177,226 | 4/1965 | Stilz et al. | 560/75 |
| 3,361,784 | 1/1968 | Leu | 260/45.9 NC |
| 3,565,855 | 2/1971 | Meltsner | 260/45.95 D |
| 3,579,532 | 5/1971 | Nochkur et al. | 260/943 |
| 3,622,654 | 11/1971 | Pande | 260/940 |
| 3,679,779 | 7/1972 | Emden et al. | 260/943 |
| 3,746,758 | 7/1973 | Spivack | 260/45.95 D |
| 3,821,334 | 6/1974 | Schmidt et al. | 260/940 |
| 4,009,207 | 2/1977 | Hoffman | 260/45.9 NC |

*Primary Examiner*—V. P. Hoke
*Attorney, Agent, or Firm*—Bruce F. Jacobs

[57] ABSTRACT

Tertiary phosphine oxide compounds are disclosed as well as their use as stabilizers for polymers.

20 Claims, No Drawings

POLYMERS STABILIZED WITH ORGANO-PHOSPHORUS COMPOUNDS

This invention relates to stabilizing thermoplastic polymers against thermal and/or ultraviolet light degradation. More particularly, it relates to novel organo-phosphorus compounds for doing so, the process for stabilizing polymers thereby, and the compositions so obtained.

It is well-known that thermal oxidation and/or exposure to ultraviolet light causes degradation of thermoplastic polymers as evidenced by embrittlement or yellowing of articles made therefrom. It is also well-known that this degradation can be inhibited by the use of stabilizer additives incorporated in or on such articles. Various additives, used alone or in combinations, have been suggested to inhibit such degradation in order to prolong the useful lives of articles made from such polymers. Since none has been found to be completely satisfactory, research continues in order to find compounds or combinations of compounds which will be more satisfactory. The present invention arose out of such research and resulted in the discovery of novel compounds which stabilize thermoplastic polymers against degradation by thermal oxidation and/-or exposure to ultraviolet light.

Phosphorous containing stabilizers for polymers have been known. Examples of such compounds are disclosed in such as U.S. Pat. Nos. 3,280,070, 3,367,870 and 4,069,200. None of these patents disclose tertiary phosphine oxides, the subject of the present invention.

In accordance with the present invention there are provided (1) compounds represented by formula (I)

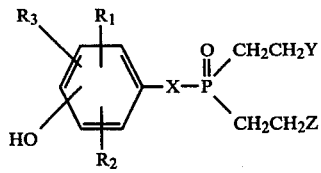

wherein $R_1$ and $R_2$ are each alkyl radicals having 1 to 18 carbon atoms, $R_3$ is hydrogen or an alkyl radical having 1 to 18 carbon atoms, X is O or $(CH_2)_n$ wherein n is an integer from 1 to 4, and Y and Z are each selected from CN,

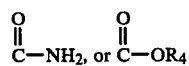

wherein $R_4$ is an alkyl radical having 1 to 18 carbon atoms, which stabilize polymers against degradation by thermal oxidation and/or ultraviolet radiation;

(2) methods for stabilizing polymers against degradation by thermal oxidation and/or ultraviolet radiation by incorporating therein an effective amount of a compound of formula (I) alone, or in combination with an effective amount of an antioxidant. Preferably the antioxidant is of formula (II)

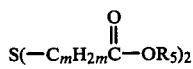

wherein $R_5$ represents alkyl of 6 to 24 carbon atoms and m is an integer from 1 to 6, and (3) polymer compositions obtained by the methods of (2).

Preferably, Y and Z are the same and the polymer is a polyolefin.

More preferably, the novel compound is represented by formula (III) and the polymer is polypropylene.

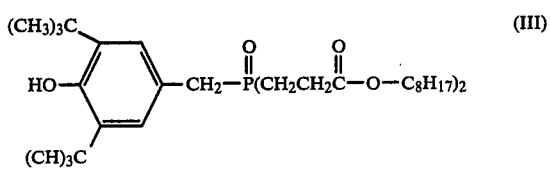

Preferably, the anitioxidant of formula (II) is distearyl β-thiodipropionate.

The compounds of the present invention may be prepared by different procedures. The compounds of formula (I) wherein X is $(CH_2)_n$ can be prepared by reacting a compound of formula (IV) with a phosphine oxide of formula (V), as illustrated by the following reaction

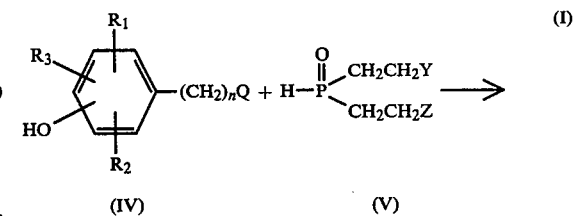

wherein $R_1$, $R_2$, $R_3$, n, Y and Z are as previously defined, and Q represents chloro, bromo, or iodo. An alkali metal salt of the phosphine oxide may also be reacted with the compound of formula (IV) to achieve a similar result.

Suitable compounds of formula (IV) which can be used in this reaction include such as the following:
2,6-Di-tert.-butyl-4-chloromethylphenol,
2,6-Di-tert.-octyl-4-chloromethylphenol,
2,4-Di-tert.-butyl-6-chloromethylphenol,
2,6-Di-tert.-butyl-4-(2-chloroethyl)phenol,
2,6-Di-tert.-butyl-4-(3-bromopropyl)phenol,
3,5-Di-tert.-butyl-4-bromomethylphenol,
3,6-Di-isopropyl-4-(4-bromobutyl)phenol,
2-Tert.-butyl-6-isopropyl-4-chloromethylphenol,
2-Tert.-butyl-6-methyl-4-chloromethylphenol,
2-Methyl-6-octadecyl-4-chloromethylphenol,
2-Tert.-octyl-5-methyl-4-chloromethylphenol,
2,4-Dimethyl-6-tert.-butyl-3-chloromethylphenol,
and the like.

Suitable compounds of formula (V) which can be used in this reaction include such as the following:
Bis(2-cyanoethyl)phosphine oxide,
Bis(2-carbethoxyethyl)phosphine oxide,
Bis(2-carbomethoxyethyl)phosphine oxide,
Bis(2-carbopropoxyethyl)phosphine oxide,
Bis(2-carbobutoxyethyl)phosphine oxide,
Bis(2-carboctyloxyethyl)phosphine oxide,
Bis(2-carbododecyloxyethyl)phosphine oxide,
Bis(2-carboctadecyloxyethyl)phosphine oxide,
Bis(2-carbamoylethyl)phosphine oxide,
and the like.

Optionally, compounds of formula (I) wherein Y and Z are

may be prepared by reacting a compound represented by formula (VI)

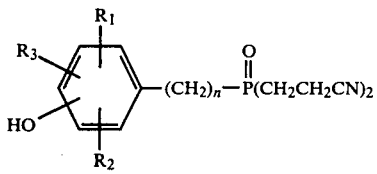

with an alcohol of 1 to 18 carbon atoms in the presence of an aromatic sulfonic acid, such as benzenesulfonic acid monohydrate or p-toluenesulfonic acid monohydrate, as described by James and Bryan, J. Org. Chem. 23, 1225 (1958). The principal product obtained is the compound wherein Y and Z are

with a by-product wherein each is

The compounds wherein Y and Z are

may also be obtained by hydrolysis of the compounds of formula (VI) under known conditions.

Suitable alcohols which can be used in the method of James and Bryan include the following:
Ethanol,
n-Propanol,
n-Butanol,
i-Pentanol,
n-Octanol,
n-Dodecanol,
n-Octadecanol, and the like.

The compounds of formula (I) wherein X is 0 can be prepared by reacting a suitable benzoquinone with a phosphine oxide of formula (IV), as shown below, for the reaction with 2,6-di-tert.-butyl-1,4-benzoquinone.

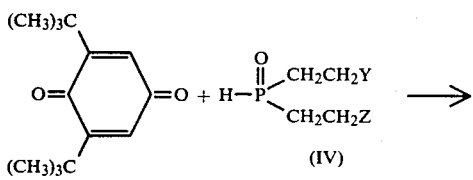

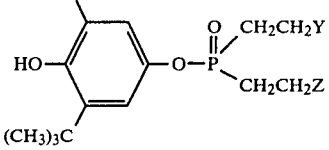

Suitable benzoquinones which may be used in the above reaction include:
2,6-di-tert.-octyl-1,4-benzoquinone,
3,5-di-tert.-butyl-1,2-benzoquinone,
2-methyl-6-octadecyl-1,4-benzoquinone,
2-isopropyl-6-tert.-octyl-1,4-benzoquinone,
and the like.

Illustrative of polymers which may be used as the polymeric material in the subject invention are the following: polyethylene, polypropylene, poly(vinyl chloride), poly(methyl methacrylate), poly(styrene), high impact poly(styrene), polycarbonate, poly(caprolactam), poly(hexamethylene adipamide), poly(hexamethylene terephthalamide), poly(methyl acrylate), poly(ethylene terephthalate), cellulose acetate, acrylonitrile-butadiene-styrene copolymers, butadiene-styrene copolymers, acrylonitrile-styrene copolymers, butadiene-acrylonitrile copolymers, and the like, and blends thereof.

The preferred polymeric material is polypropylene.

The compounds of this invention may be incorporated into such polymers by any of the various procedures known in the art for such purpose, such as by dry blending the additive with the polymer in powder or granular form followed by milling, Banbury mixing, molding, casting, extruding, swelling, and the like; by immersing the polymer as film, sheet, fibers, etc. in a solution of the additive in an appropriate solvent (as in a dyeing process), etc.

The amount of the compound of formula (I), needed to be an effective amount for stabilizing the polymer against degradation will depend on the nature of the polymer and the amount of exposure to oxygen and ultraviolet light to which the article will be subjected. For most purposes, it is sufficient to use an amount of the compound of formula (I) within the range of about 0.01 to about 5 percent by weight, preferably 0.05 to 1 percent by weight, based on the weight of untreated polymer.

The compounds of formula (I) may be used in the polymer composition alone or in combination with other additives, such as fillers, antioxidants, flame retardants, heat stabilizers, anti-slipping and anti-static agents, supplemental light stabilizers, pigments, dyes, lubricants, etc.

As with the compound of formula (I), any further additive is advantageously employed in a proportion within the range of from about 0.01 to about 5 percent by weight, preferably 0.05 to 1 percent by weight, based on the weight of untreated polymer.

Illustrative of suitable antioxidants are those of the hindered-phenol type, such as 2,6-di-t-butyl-p-cresol; 4,4'-bis(2,6-di-t-butylphenol); 4,4'-bis(2,6-di-iso-propylphenol); 2,4,6-tri-t-butylphenol; 2,2'-thiobis(4-methyl-6-t-butylphenol); octadecyl 2(3',5'-di-t-butyl-4'-hydroxyphenyl)propionate, etc.; esters of β-thiodipropionic acid, such as dilauryl β-thiodipropionate and distearyl β-thiodipropionate, etc.; hydrocarbyl phosphites, such as triphenyl phosphite, trinonyl phosphite, diphenyldecyl phosphite, etc.; and combinations thereof.

Illustrative of the supplemental light stabilizers are those of the benzotriazole class, such as 2-(2'-hydroxy-5'-methylphenyl)benzotriazole; 2-(2'-hydroxy-3',5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-dimethoxybenzophenone; hindered phenol esters, such as 2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'-thiobis(4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc.; nickel complex of 2-hydroxy-4-methylphenyl-undecyl ketone oxime, etc. Further illustrative examples of suitable antioxidants and of suitable supplemental light stabilizers can be found in columns 3 and 4 of U.S. Pat. Nos. 3,488,290 and 3,496,134 and the other patents mentioned therein.

The following examples, in which parts and percentages are by weight unless otherwise stated, are presented to further illustrate the present invention.

EXAMPLE 1

Preparation of 3,3'-[(3,5-Di-tert.-butyl-4-hydroxybenzylidene)phosphinylidene]dipropionitrile

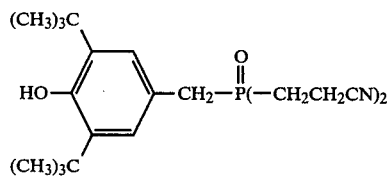

Bis-(2-cyanoethyl)phosphine oxide (8.0 grams; 0.051 mole) is dissolved in 25 mls. of warm N,N-dimethylacetamide and 2,6-di-tert.-butyl-4-chloromethylphenol (12.7 grams; 0.05 mole) is added thereto. The reaction mixture is warmed slightly and triethylamine is added dropwise until a permanent pale purple color results. The reaction mixture is then cooled to room temperature and diluted with water to precipitate a solid which is recovered by filtration, washed successively with water, methanol, and ligroin, and dried to obtain 17.0 grams (92% yield; m.p. 180°–183° C.). Recrystallization from isopropanol raised the melting point to 183°–184° C.

Calculated for $C_{21}H_{31}N_2O_2P$: C,67.38%; H,8.29%; N,7.48%; Found: C,67.55%; H,8.18%; N,7.56%.

EXAMPLE 2

Preparation of n-Octyl 3-[(2-carbamoylethyl)(3,5-di-tert.-butyl-4-hydroxybenzyl)phosphinyl]propionate

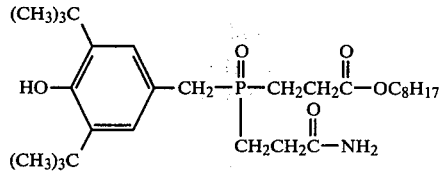

The product of Example 1 (3.75 grams; 0.01 mole), p-toluenesulfonic acid monohydrate (3.90 grams; 0.02 mole), and n-octanol (2.60 grams; 0.02 mole) are mixed in a test tube and heated to 100° C. to obtain a clear melt. As the temperature approaches 100° C., an exotherm causes the temperature to rise to about 150° C. and the melt becomes cloudy and thicker. The reaction mixture is then stirred and heated to 200° C. After holding at 200° C. for 5 minutes, the reaction mixture is cooled to room temperature and diluted with water (50 mls.) and pentane (100 mls.) The insoluble solid is separated by filtration and recrystallized from nitromethane to obtain 0.74 gram of the desired product, m.p. 154.5°–157° C.

Calculated for $C_{29}H_{50}NO_5P$: C, 66.5%; H, 9.55%; N, 2.67%; Found: C, 66.3%; H, 9.28%; N, 2.59%.

EXAMPLE 3

Preparation of Di-n-Octyl 3,3'-[(3,5-di-tert.-butyl-4-hydroxybenzyl)phosphinylidene]dipropionate

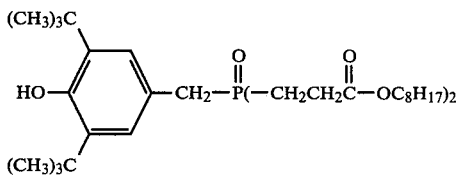

The filtrate from Example 2, containing water and pentane, is recovered and the water layer is separated. The pentane layer is then heated to strip off pentane and obtain 5.1 grams of a yellow oil which is further heated at 180° C. under a 1 mm. vacuum to remove volatile materials and obtain the desired product.

Calculated for $C_{37}H_{65}O_6P$: C, 69.87%; H, 10.22%; Found: C, 69.36%; H, 9.89%.

EXAMPLE 4

Preparation of 3,3'-[(3,5-Di-tert.-butyl-2-hydroxybenzyl)phosphinyl]dipropionitrile

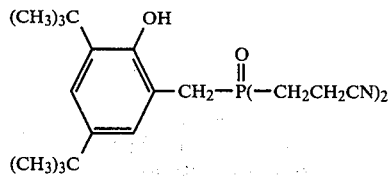

The procedure of Example 1 is repeated utilizing 3.12 grams of bis-(2-cyanoethyl)-phosphine oxide, 5.09 grams of 2,4-di-tert.-butyl-6-chloromethylphenol and 15 mls. of N,N-dimethylacetamide. There is obtained 6.90 grams of a white solid which melts at 143°–144.5° C. after recrystallization from n-butanol.

Calculated for $C_{21}H_{31}N_2O_2P$: C, 67.38%; H, 8.29%; N, 7.48%; Found: C, 67.15%; H, 8.35%; N, 7.42%.

EXAMPLE 5

Preparation of 3,5-Di-tert.-butyl-4-hydroxyphenyl Bis(2-cyanoethyl)phosphinate

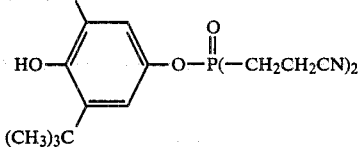

2,6-Di-tert.-butyl-1,4-benzoquinone (11.0 grams; 0.05 mole) and bis-(2-cyanoethyl)phosphine oxide (8.0 grams; 0.05 mole) are dissolved in 20 mls. of N,N-dimethylacetamide and the solution is heated at reflux for 2 hours. The solution is then cooled to ambient conditions and drowned in water to precipitate a pale yellow oil which is subsequently separated, washed well with water, and extracted with diethyl ether. The ethereal extract is then stripped of diethyl ether and the residue is dried in vacuo at 50° C. to obtain 7.56 grams of a yellow oil which has an infrared absorption spectrum consistent with the desired product.

EXAMPLE 6

Preparation of Di-n-Octyl 3,3'-[(3,5-di-tert.-butyl-4-hydroxyphenoxy)phosphinylidene]dipropionate

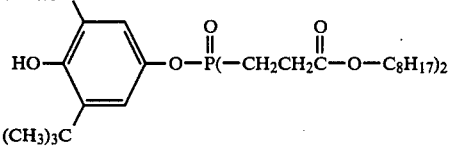

The product of Example 5 (3.76 grams; 0.01 mole), n-octanol (2.60 grams; 0.02 mole), and p-toluenesulfonic acid (4.0 grams; 0.021 mole) are stirred together and warmed to obtain a clear, pale yellow solution. The solution is heated to about 135° C. at which point an exotherm causes the temperature to rise to about 150° C. The solution is then heated to about 160° C., maintained thereat for 5 minutes, cooled to ambient conditions and drowned in water to precipitate an oil which is subsequently separated and extracted with diethyl ether. The ethereal extract is then evaporated and the residue is dried in vacuo at 50° C. to obtain 5.95 grams of a red oil. The oil is heated at 150° C. under a vacuum of 0.5 mm. to remove n-octanol and then cooled to ambient conditions and dissolved in ligroin. The ligroin solution is decanted from some insoluble solids and evaporated to obtain 4.45 grams of a brown oil which has an infrared absorption spectrum consistent with the desired product.

EXAMPLE 7

Preparation of 3,3'-[(3,5-Di-tert.-butyl-4-hydroxybenzylidene]dipropionamide

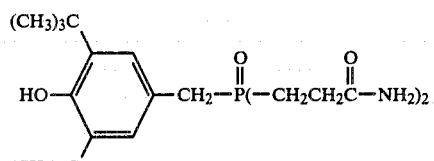

In the manner described in Example 1 substituting 9.8 grams (0.051 mole) of bis-(2-carbamoylethyl)phosphine oxide for the bis-(2-cyanoethyl)phosphine oxide, the desired compound is obtained.

EXAMPLE 8

Preparation of 3,3'-[(3,5-Di-tert.-octyl-4-hydroxybenzylidene)phosphinylidene]dipropionitrile

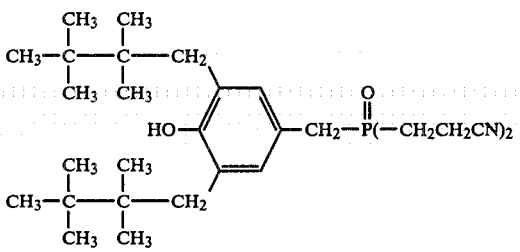

In the manner described in Example 1 substituting 2,6-di-tert.-octyl-4-chloromethylphenol (18.3 grams; 0.05 mole) for the 2,6-di-tert.-butyl-4-chloromethylphenol, the desired compound is obtained.

EXAMPLE 9

Preparation of n-Octadecyl 3-[(2-carbamoylethyl) (3,5-di-tert.-octyl-4-hydroxybenzyl)phosphinyl]propionate

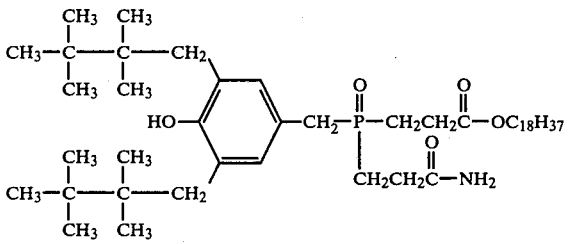

In the manner of Example 2 substituting 4.87 grams (0.01 mole) of the product of Example 8 for the product of Example 1, and 5.41 grams (0.02 mole) of n-octadecanol for n-octanol, the desired product is obtained.

EXAMPLE 10

Preparation of Di-n-Octadecyl 3,3'-[(3,5-di-tert.-octyl-4-hydroxybenzyl)prosphinylidene]dipropionate

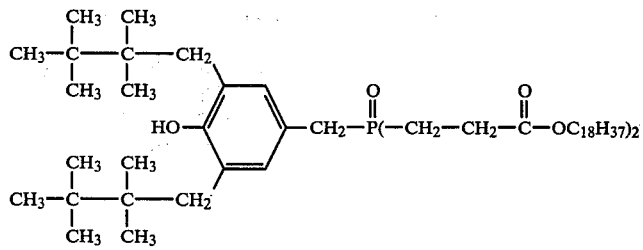

In the manner of Example 3 utilizing the filtrate obtained from Example 9, the desired compound is obtained.

EXAMPLES 11–17

The products of Examples 1–6 (0.10 gram) are separtely roll-milled at 170°–175° C. (20 passes) with unstabilized polypropylene (50.0 grams of pro-fax ® 6401; Hercules Inc.; Wilmington, Del.), and each blend is compression molded at 210° C. for 3.0 minutes to obtain films about 18.5–19.0 mils thick. The film is then exposed to a carbon arc in a Color Fade-Ometer ® (Atlas Electric Devices Company, Chicago, Ill.) until the sample shows an increased carbonyl content of 0.1% by weight as determined by infrared spectrophotometry. This level of carbonyl content coincides with the point of embrittlement of the film. The following results are obtained.

| Example | Additive | Hours to 0.1% Carbonyl Content |
|---|---|---|
| 11 | Product of Example 1 | 300–400 |
| 12 | Product of Example 2 | 200–300 |
| 13 | Product of Example 3 | 200–300 |
| 14 | Product of Example 4 | 100–200 |
| 15 | Product of Example 5 | 100–200 |
| 16 | Product of Example 6 | 100–200 |
| 17 | None | 0–100 |

EXAMPLES 18–24

Newly molded films of Examples 11–17, respectively, are tested for resistance to thermal oxidation by storing in a forced hot-air oven at 140° C. and the time in hours required for the onset of physical degradation, as evidenced by surface cracking or crazing, is determined. The results are:

| Example | Additive | Hours to Degradation |
|---|---|---|
| 18 | Product of Example 1 | 40–48 |
| 19 | Product of Example 2 | 263–327 |
| 20 | Product of Example 3 | 428–496 |
| 21 | Product of Example 4 | 1–17 |
| 22 | Product of Example 5 | 71–135 |
| 23 | Product of Example 6 | 119–143 |
| 24 | None | 0–6 |

EXAMPLES 25–27

The products of Examples 2 and 3 (0.10 gram) are separately blended with unstabilized polypropylene (100.0 grams) and distearyl β-thiodipropionate (0.25 gram), compression molded into films, as described in Examples 7–13, and evaluated for resistance to thermal oxidation, as described in Examples 18–24, utilizing a hot-air oven at 150° C. The results obtained are listed below under Examples 25–27, respectively.

| Example | Additive | Hours to Degradation |
|---|---|---|
| 25 | Product of Example 2 | 336–400 |
| 26 | Product of Example 3 | 425–431 |
| 27 | None | 0–30 |

What is claimed is:

1. A compound represented by the formula:

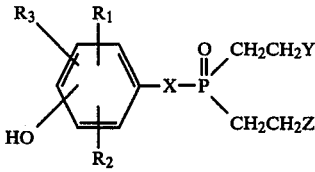

wherein $R_1$ and $R_2$ are each alkyl having 1 to 18 carbon atoms, $R_3$ is hydrogen or alkyl having 1 to 18 carbon atoms, X is O or $(CH_2)_n$ wherein n is an integer from 1 to 4, and Y and Z are each selected from CN,

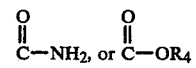

wherein $R_4$ is alkyl having 1 to 18 carbon atoms.

2. The compound of claim 1 wherein X is $CH_2$.
3. The compound of claim 1 of the formula:

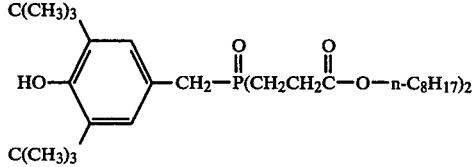

4. The compound of claim 1 of the formula:

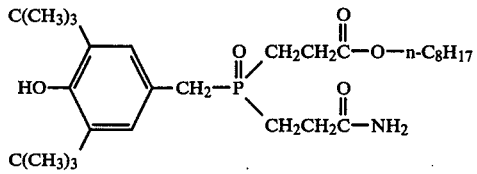

5. The compound of claim 1 of the formula:

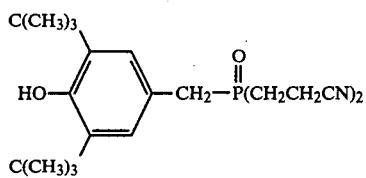

6. The compound of claim 1 of the formula:

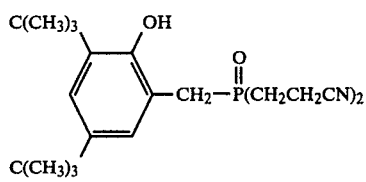

7. The compound of claim 1 of the formula:

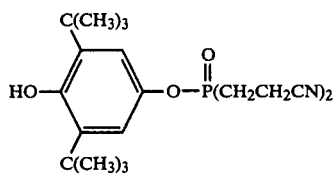

8. The compound of claim 1 of the formula:

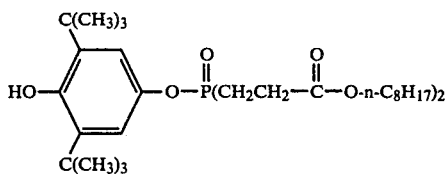

9. A method for stabilizing a polymer against degradation by heat or ultraviolet light which comprises incorporating in said polymer an effective amount of a compound of claim 1.

10. The method of claim 9 wherein said polymer is a polyolefin.

11. The method of claim 10 wherein said polyolefin is polypropylene.

12. The method of claim 9 wherein said effective amount is about 0.01% to about 5% by weight of said compound based on the weight of the polymer.

13. The method of claim 9 further containing an effective amount of an antioxidant having the formula:

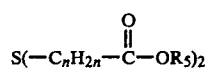

wherein $R_5$ is alkyl of 6 to 24 carbon atoms and n is 1 to 6.

14. The method of claim 13 wherein the antioxidant is distearyl β-thiodipropionate.

15. The method of claim 13 wherein the polymer is a polyolefin.

16. The method of claim 15 wherein the polyolefin is polypropylene.

17. The method of claim 13 wherein said effective amount of antioxidant is about 0.01% to about 5% by weight based on the weight of the polymer.

18. The method of claim 10 wherein the compound is di-n-octyl 3,3'-[(3,5-di-tert.-butyl-4-hydroxybenzyl)-phosphinylidene]dipropionate.

19. The method of claim 16 wherein the compound is di-n-octyl 3,3'-[(3,5-di-tert.-butyl-4-hydroxybenzyl)-phosphinylidene]dipropionate and the antioxidant is distearyl β-thiodipropionate.

20. A composition comprising a polymer normally subject to degradation by heat or ultraviolet light and an effective amount of a compound of claim 1.

* * * * *